Dec. 29, 1942. E. F. FLINT 2,306,874
LIQUID LEVEL
Filed April 18, 1942
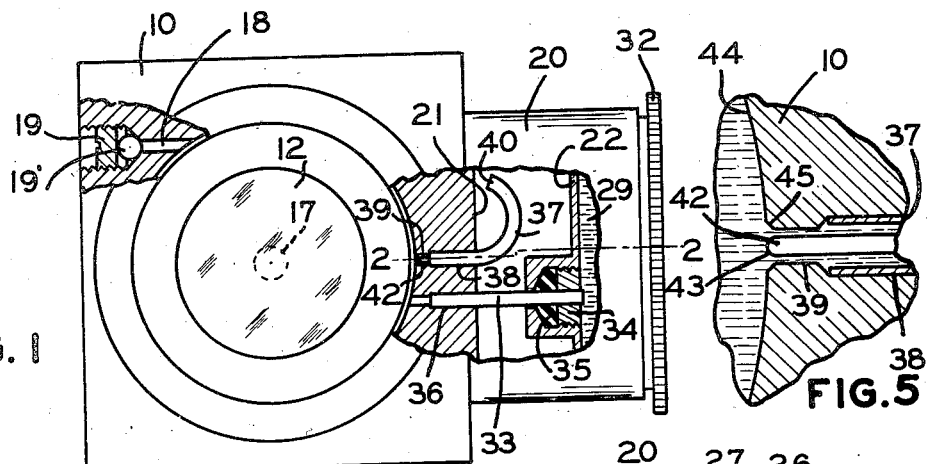
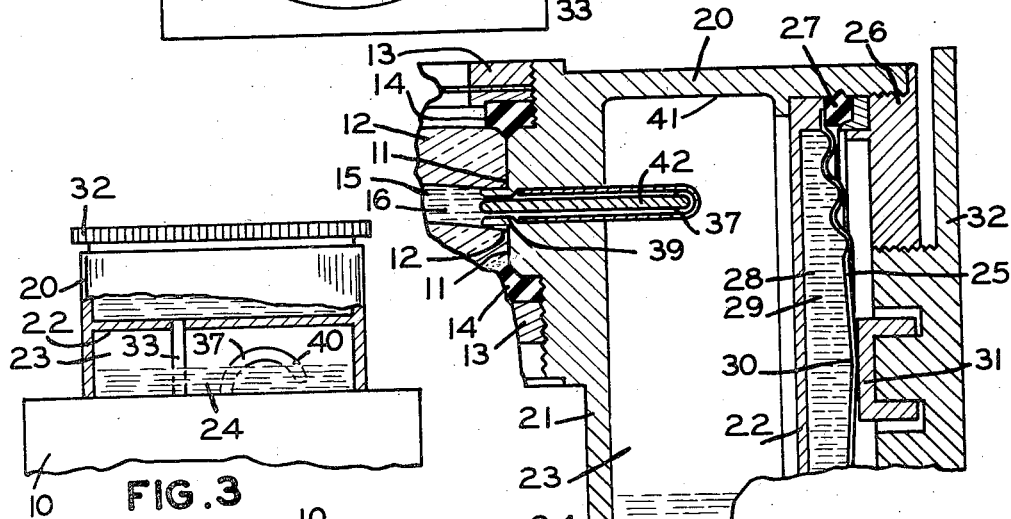
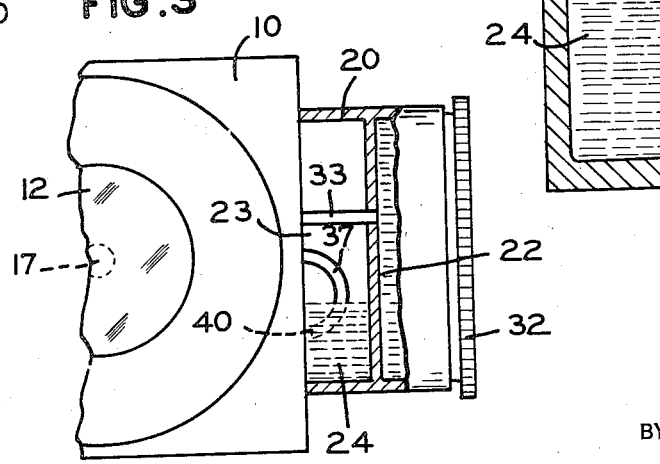
EDWARD F. FLINT
INVENTOR
BY *[signature]*
ATTORNEY Patented Dec. 29, 1942

2,306,874

UNITED STATES PATENT OFFICE 2,306,874

LIQUID LEVEL

Edward F. Flint, Rochester, N. Y., assignor to Bausch & Lomb Optical Company, Rochester, N. Y., a corporation of New York Application April 18, 1942, Serial No. 439,517

4 Claims. (Cl. 33—212)

This invention relates to liquid levels and more particularly it has reference to liquid levels of the type which embody means for varying the size of the bubble.

One of the objects of my invention is to provide a liquid level having improved means for varying the size of the bubble. Other objects are to provide a liquid level having means for increasing the size of the bubble by small increments while the level is in operative position; to provide temperature-compensating means for the bubble and to generally provide a compact and efficient liquid level having an adjustable bubble. These and other objects and advantages reside in certain novel features of construction, arrangement and combination of parts as will hereinafter be more fully explained and pointed out in the appended claims.

Referring to the drawing:

Fig. 1 is a top plan view of my improved liquid level, with parts in section.

Fig. 2 is an enlarged fragmentary vertical section taken on line 2—2 of Fig. 1.

Fig. 3 is a fragmentary view showing the relation of parts when the level is in position for reducing the size of the bubble.

Fig. 4 is a fragmentary view showing the relation of parts when the level is not in use and the bubble is compensated for temperature changes.

Fig. 5 is a fragmentary sectional view of a detail.

A preferred embodiment of my level is shown in the drawing wherein 10 indicates a block which is bored out to provide seats 11 for the spaced glass lens elements 12. The latter are held in position by threaded bezels 13 cooperating with gaskets 14 to provide a liquid-tight bubble cell 15 which is filled with a suitable liquid 16 in which the bubble 17 is located. The cell may be filled through the opening 18 which is closed by the shellacked screw 19 and the ball valve 19'.

Projecting laterally from the block 10 and preferably formed integral therewith is the housing 20 which projects downwardly a substantial distance below the block 10. The wall 21 together with the spaced, fixed wall 22 and the housing 20 form a closed reservoir 23 which contains an amount of liquid 24 while the remaining space contains air. Mounted within housing 20 and in spaced relation to fixed wall 22 is a resilient, deformable wall 25 which is held in place by a threaded bezel 26 and gasket 27. The two walls 22 and 25 thus provide a closed chamber 28 which contains liquid 29. The wall 25 is normally bowed out at its central portion, as shown at 30, so that it is always in contact with the plunger 31 carried by the nut 32 threaded into bezel 26. Since the wall 25 is resilient, it may be moved back and forth by actuating the nut 32 and thereby increase or decrease the volume of the chamber 28.

Chamber 28 is in communication with the bubble cell 15 through the tube 33 which passes through a hole in wall 22 and is held in position by the nut 34 and gasket 35. The other end of tube 33 is positioned in a hole 36 drilled in the wall 21 and is secured in place by the use of cement or other suitable means so as to afford a liquid-tight joint. The reservoir 23 is in communication with the bubble cell 15 through the tube 37 which has one end fixedly secured in the hole 38 in wall 21 of block 10, the hole 38 being connected to the cell 15 by the hole 39 which has a smaller diameter than hole 38. The tube 37 extends substantially horizontally from the cell 15 and is then preferably bent or otherwise disposed so that the open end 40 is located adjacent the upper wall 41 of reservoir 23 and is also adjacent the inner wall 21, for purposes to be hereinafter explained.

In order to reduce the volume of tube 37, a solid wire or rod 42 is placed therein. The rod 42 is substantially coextensive with tube 37 and one end of the rod 42 is rounded or reduced as shown at 43 and extends so that it is substantially flush with the inner wall 44 of bubble cell 15. In one embodiment of my invention, the tube 37 has an inside diameter of .040 in., the rod 42 has a diameter of .030 in. and hole 39 has a diameter of .035 in.

After the bubble cell 15 and liquid chamber 29 have been completely filled with liquid and the reservoir 23 has been filled about one-third full of liquid, the bubble 17 is formed by the following operations With the cell 15 held in the horizontal position which it occupies when in use, the knurled nut 32 is turned back and forth so as to alternately expand and compress the flexible wall 25 and thereby cause a "pumping" action. When wall 25 is slightly compressed, a small amount of liquid is forced out of chamber 29 through tube 33, into the cell 15 and out through the tube 37 to the reservoir 23. Then when the wall 25 is expanded, a small amount of air is sucked in from reservoir 23 through the tube 37 and into the bubble cell 15, since the end 40 of tube 37 is, in the normal position of the level, not submerged in liquid.

By continual "pumping" action through manipulation of knurled nut 32, small bubbles of air are sucked into the cell 15 where they unite to form a bubble. When a bubble of the desired size has been thusly formed, the pumping action is discontinued. The size of the bubble 17 may be controlled efficiently if the pumping action sucks tiny bubbles into the cell. In order to assure such tiny bubbles, the rod or wire 42 is placed within tube 37 and the rod 42 also extends through the hole 39 so that the end of the rod 42 is substantially flush with the inner wall of cell 15. To permit the tiny bubbles to escape into the cell 15 readily and not cling to the orifice, the end of rod 42 is preferably reduced or rounded as shown at 43 and the orifice of hole 39 is slightly enlarged or beveled as shown at 45.

To reduce the size of bubble 17, the level is held with the knurled nut 32 uppermost so that the parts are as shown in Fig. 3 with the free end 40 of tube 37 submerged in the liquid 24 in reservoir 23. With the level in this position, the bubble 17 is positioned at the orifice of hole 39. By turning nut 32 so as to create the pumping action, the bubble 17 is forced out through the tube 37 and bubbles up through the liquid covering the tube end 40 and passes into the reservoir.

Liquid levels such as disclosed herein may be used in various instruments such as sextants and octants, for example. For such uses, it is usually desirable to maintain the bubble size and hence it is necessary to provide some temperature-compensating means so that the bubble size will be substantially the same despite changes in temperature. This will be accomplished if the instrument, when not in use, is placed in its case so that the level is in the position shown in Fig. 4. In such a position, the end 40 of tube 37 is submerged in the liquid 24. Since the reservoir 23 contains a volume of air which is many times greater than the volume of the bubble 17 and since the liquid is substantially incompressible, any change of pressure due to change in temperature will have little, if any, effect on the size of the bubble.

From the foregoing, it will be apparent that I am able to attain the objects of my invention and provide an improved liquid level having a temperature-compensated bubble which can be readily controlled so as to adjustably vary its size. Various modifications can obviously be made without departing from the spirit of my invention.

I claim:

1. A liquid level comprising means defining a substantially horizontal bubble cell containing a liquid and a bubble, a housing positioned laterally of the cell and defining a reservoir which contains a gas and a liquid and extends below the cell for a substantial distance, the capacity of said reservoir being much greater than that of the cell, walls defining a liquid chamber positioned laterally of the reservoir, one of said walls being movable, means for selectively moving said wall, a first tube connecting said cell and chamber and a second tube extending from the cell and into the reservoir and terminating at a point which is adjacent the upper wall of the reservoir and is also adjacent to the wall which separates the cell from the reservoir.

2. A liquid level comprising a substantially horizontally disposed bubble cell, a closed reservoir positioned laterally of the cell and extending more than one-half of its length below the cell, a liquid chamber positioned laterally of the reservoir, said chamber having a wall which is movable to vary the volume of the chamber, means for selectively moving said wall, means providing communication between the cell and chamber and means providing communication between said cell and reservoir, said last-named means comprising a tube connected to said cell and extending into said reservoir and terminating at a point which is adjacent the top wall of the reservoir and the wall separating the reservoir from the cell, and a member partially filling the space inside of said tube, one end of said member being substantially flush with the inner wall of the cell.

3. In a liquid level the combination of a bubble cell containing liquid and a gaseous bubble, a chamber containing liquid, a reservoir containing a liquid and a gas, communicating means connecting the chamber and the cell, means for adjustably varying the volume of the chamber, communicating means connecting the cell and the reservoir, said last-named means having an orifice opening into the cell and a member smaller than and substantially concentric to said orifice and substantially flush with the inner wall of the cell whereby tiny gaseous bubbles may be forced into the cell by adjustably varying the volume of the chamber.

4. In a liquid level the combination of a bubble cell containing liquid and a gaseous bubble, a chamber containing liquid, a reservoir containing a liquid and a gas, communicating means connecting the chamber and the cell, means for adjusting the volume of the chamber, a tube connecting the cell and the reservoir, and a member partially filling the tube, said member being substantially coextensive with the tube and having one of its end portions partially reduced and substantially flush with the inner wall of the bubble cell.

EDWARD F. FLINT.